United States Patent
Kim et al.

(10) Patent No.: US 9,354,682 B2
(45) Date of Patent: May 31, 2016

(54) MOBILE ELECTRIC APPARATUS HAVING SOLAR CELLS

(75) Inventors: Kun-suk Kim, Suwon-si (KR); Hae-soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 13/594,081

(22) Filed: Aug. 24, 2012

(65) Prior Publication Data

US 2013/0050948 A1 Feb. 28, 2013

(30) Foreign Application Priority Data

Aug. 31, 2011 (KR) ........................ 10-2011-0088212

(51) Int. Cl.
| | | |
|---|---|---|
| *G06F 1/16* | (2006.01) | |
| *H02N 6/00* | (2006.01) | |
| *G06F 1/00* | (2006.01) | |
| *G06F 1/26* | (2006.01) | |
| *G06F 1/18* | (2006.01) | |
| *H02J 7/35* | (2006.01) | |
| *H04M 1/21* | (2006.01) | |

(52) U.S. Cl.
CPC .............. *G06F 1/263* (2013.01); *G06F 1/1616* (2013.01); *G06F 1/1635* (2013.01); *G06F 1/1637* (2013.01); *G06F 1/188* (2013.01); *G06F 1/189* (2013.01); *G06F 1/26* (2013.01); *H02J 7/355* (2013.01); *H04M 1/21* (2013.01)

(58) Field of Classification Search
CPC ....... G06F 1/1635; G06F 1/188; G06F 1/189; G06F 1/26; G06F 1/263; H02J 7/355; H04M 1/21
USPC ............. 361/679.01–679.45, 679.55–679.59; 136/207, 245, 246, 248, 251; 206/320; 320/101; 713/300
See application file for complete search history.

(56) References Cited

U.S. PATENT DOCUMENTS

| | | | | |
|---|---|---|---|---|
| 5,039,928 | A * | 8/1991 | Nishi | G06F 1/1632 136/291 |
| 5,260,885 | A * | 11/1993 | Ma | G06F 1/1626 136/245 |
| 2001/0004198 | A1* | 6/2001 | Matsuyama | G06F 1/1632 320/101 |
| 2006/0170223 | A1* | 8/2006 | Homer | E05B 65/006 292/102 |
| 2008/0092941 | A1* | 4/2008 | Kuo | G06F 1/1616 136/248 |
| 2008/0094025 | A1* | 4/2008 | Rosenblatt | G06F 1/1616 320/101 |
| 2010/0265646 | A1* | 10/2010 | Lee | G06F 1/1616 361/679.09 |
| 2010/0271776 | A1 | 10/2010 | Shimizu | |
| 2012/0105401 | A1* | 5/2012 | Tu | G06F 1/263 345/207 |
| 2012/0110354 | A1* | 5/2012 | Liu | G06F 1/26 713/300 |
| 2012/0120047 | A1* | 5/2012 | Choi | H02J 7/35 345/212 |

FOREIGN PATENT DOCUMENTS

| | | |
|---|---|---|
| CN | 1622004 A | 6/2005 |
| CN | 101145743 A | 3/2008 |

(Continued)

*Primary Examiner* — Nidhi Thaker
(74) *Attorney, Agent, or Firm* — Jefferson IP Law, LLP

(57) ABSTRACT

A mobile electronic apparatus includes a main body unit having a main board, a display unit disposed so as to rotate with respect to the main body unit for operating according to a control of the main board, a solar cell module disposed on a rear surface of the display unit for generating electric power by converting solar energy into electric power, and a converting circuit disposed inside the display unit for stabilizing electric power generated by the solar cell module so as to supply stable electric power.

11 Claims, 8 Drawing Sheets

(56) References Cited

FOREIGN PATENT DOCUMENTS

| | | |
|---|---|---|
| CN | 101169677 A | 4/2008 |
| EP | 1 246 340 A1 | 10/2002 |
| JP | 2011-8086 A | 1/2011 |
| KR | 20-0191762 | 8/2000 |
| KR | 10-2004-0013640 A | 2/2004 |
| KR | 20040013640 A  * | 2/2004 |
| KR | 10-0434048 B1 | 6/2004 |

* cited by examiner

MOBILE ELECTRIC APPARATUS HAVING SOLAR CELLS

PRIORITY

This application claims the benefit under 35 U.S.C. §119 (a) of a Korean patent application filed on Aug. 31, 2011 in the Korean Intellectual Property Office and assigned Serial No. 10-2011-0088212, the entire disclosure of which is hereby incorporated by reference.

BACKGROUND OF THE INVENTION

1. Field of the Invention

The present invention relates to a mobile electronic apparatus. More particularly, the present invention relates to a mobile electronic apparatus which can supply electric power by using solar cells.

2. Description of the Related Art

Increasingly, solar cells are used as electrical power sources for mobile electronic apparatuses such as notebook computers, netbook computers, personal media players, mobile terminals, portable electronic books, and other similar portable electronic devices. However, when using the solar cells as a primary power source of a mobile electronic apparatus, the solar cells need to supply a constant and stable voltage to the mobile electronic apparatus.

Since an output voltage of the solar cells changes according to factors such as an amount of sunlight or an irradiating circumstance of the solar cells, such as the presence of clouds in the sky, an angle of incidence of the light, and other similar factors, the solar cells need to be modified in order to provide a stable electric power source which can provide a constant output voltage. In order to provide the constant output voltage, a converter system is used to convert unstable output voltage of the solar cells into stable voltage at a high-speed. A solar cell DC/DC converter may be used as the converter system of the unstable output voltage of the solar cells.

In order to use the converter system for the mobile electronic apparatus, a separate converting circuit which operates as the converter system is arranged in the mobile electronic apparatus. In a related-art mobile electronic apparatus, the converting circuit is arranged on a main board thereof, while the solar cells are disposed on an outside surface or on a keyboard surface of the mobile electronic apparatus.

FIG. 1 illustrates a netbook computer as an example of a mobile electronic apparatus according to the related art.

Referring to FIG. 1, a converting circuit 40 is disposed with or on a main board 30, both of which are disposed in a main body unit 10 of the netbook computer 1. A keyboard 50 is disposed on the main body unit 10. Solar cells (not illustrated) are disposed on a rear side of a screen portion 21 of a display unit 20, such as an LCD unit or any other similar display unit. However, in case where the converting circuit 40 is disposed on the main board 30, as shown in the mobile electronic apparatus of FIG. 1, the main board 30 has a separate area for receiving the converting circuit 40.

When the solar cells are disposed on the display unit 20, and the converting circuit 40 is disposed on the main board 30 of the main body unit 10, a temperature difference between the solar cell disposed on the outer surface of the mobile electronic apparatus 1 and the converting circuit 40 disposed inside the main body unit 10 of the netbook computer 1 is generated such that efficiency of the solar cells may decrease.

Also, since the unstable electric power moves through a long cable from the solar cells of the display unit 20 to the main board 30 of the main body unit 10, loss of electric power is likely to occur. In addition, if a path along which the unstable electric power passes is long, the unstable electric power may cause electronic noise so as to affect other parts of the netbook computer 1.

Also, when the solar cells are disposed so as to be exposed to the outside of the mobile electronic apparatus 1, the solar cells may be damaged by an external impact or the solar cells may be contaminated by environmental contaminants.

SUMMARY OF THE INVENTION

Aspects of the present invention are to address at least the above-mentioned problems and/or disadvantages and to provide at least the advantages described below. Accordingly, an aspect of the present invention is to provide a mobile electronic apparatus that can reduce output electric power loss of solar cells by arranging a converting circuit close to the solar cells.

Another aspect of the present invention is to provide a mobile electronic apparatus that can effectively prevent Electromagnetic Interference (EMI) by transmitting stable electric power to a main body unit using an existing display cable connecting a display unit and a main board of the main body unit.

Also, when solar cells are disposed in a display unit of a mobile electronic apparatus, the present disclosure relates to a mobile electronic apparatus that can increase efficiency of the solar cells by disposing a fixing bracket between the display unit and the solar cells so as to secure the solar cells and to effectively release heat generated by the solar cells.

Also, the present disclosure relates to a mobile electronic apparatus having a cover capable of protecting solar cells.

In accordance with an aspect of the present invention, a mobile electronic apparatus is provided. The apparatus includes a main body unit including a main board, a display unit disposed so as to rotate with respect to the main body unit for operating according to a control of the main board, a solar cell module disposed on a rear surface of the display unit for generating electric power by converting solar energy into electric power, and a converting circuit disposed inside the display unit for stabilizing electric power generated by the solar cell module so as to supply stable electric power.

According to another aspect of the present invention, the display unit may include a display driving board, and the converting circuit may be formed in the display driving board.

According to another aspect of the present invention, the converting circuit may be formed on a separate exclusive board.

According to another aspect of the present invention, the converting circuit may be formed on a sub-board having a function different from a function of the display driving board.

According to another aspect of the present invention, the sub-board may include a camera module board, a $3^{rd}$ Generation (3G) system board, a $4^{th}$ Generation (4G) system board, and an antenna board.

According to another aspect of the present invention, the mobile electronic apparatus may include a display cable connecting the display unit and the main board, wherein the electric power converted by the converting circuit may be supplied to the main board through the display cable.

According to another aspect of the present invention, the mobile electronic apparatus may include a fixing bracket disposed between the display unit and the solar cell module so as to affix the solar cell module to the display unit.

According to another aspect of the present invention, the fixing bracket may include a cushioning member.

According to another aspect of the present invention, the fixing bracket may be formed of a thermally conductive material.

According to another aspect of the present invention, the mobile electronic apparatus may include a protection cover disposed above the solar cell module, wherein the protection cover may be transparent so that sunlight can pass through the protection cover.

According to another aspect of the present invention, the mobile electronic apparatus may include a gap maintaining member disposed between the protection cover and the solar cell module.

According to another aspect of the present invention, the gap maintaining member may include an insulating tape.

In accordance with an aspect of the present invention, a mobile electronic apparatus is provided. The apparatus includes a main body unit including a main board, a display unit disposed so as to rotate with respect to the main body unit for displaying data according to a control of the main board, a solar cell module disposed on a rear surface of the display unit for generating electric power by converting solar energy into electric power, a fixing bracket disposed between the display unit and the solar cell module so as to affix the solar cell module to the display unit, a protection cover disposed above the solar cell module and which is transparent so that sunlight can pass through the protection cover, and a converting circuit disposed inside the display unit for stabilizing the electric power generated by the solar cell module so as to supply stable electric power.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

Figure 1:
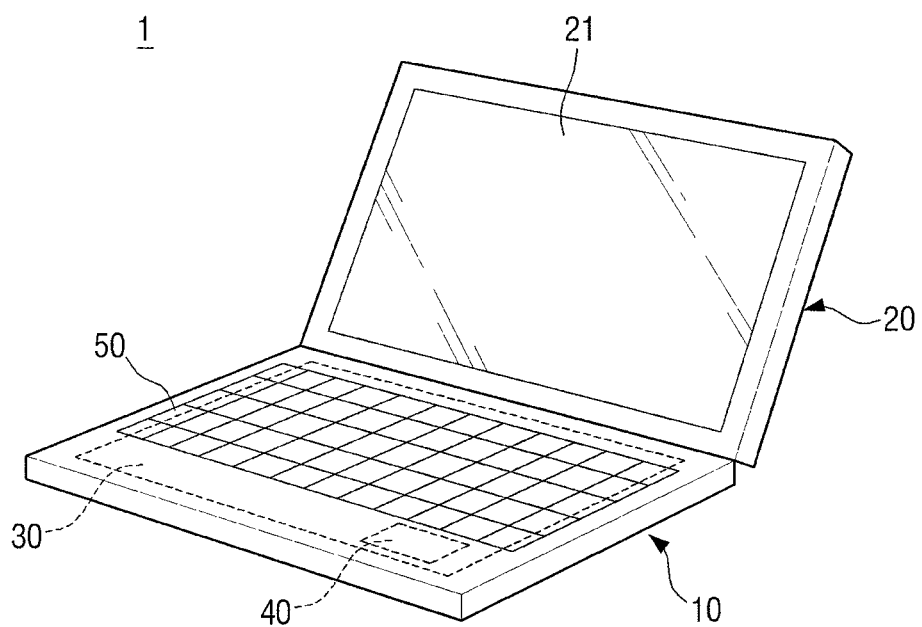
FIG. 1 is a perspective view illustrating a mobile electronic apparatus according to the related art.
Figure 2:
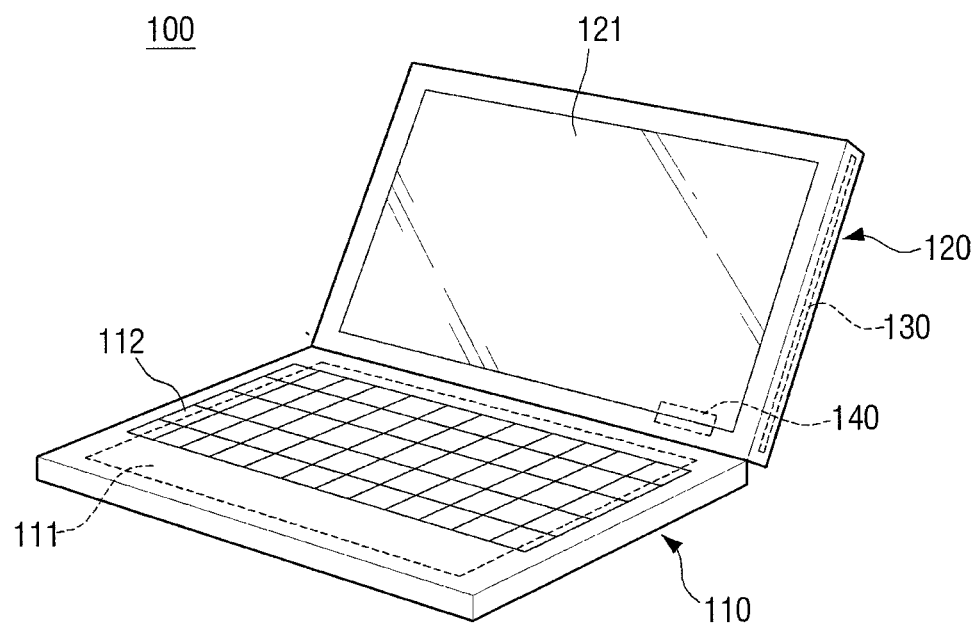
FIG. 2 is a perspective view schematically illustrating a mobile electronic apparatus according to an exemplary embodiment of the present invention.
Figure 3:
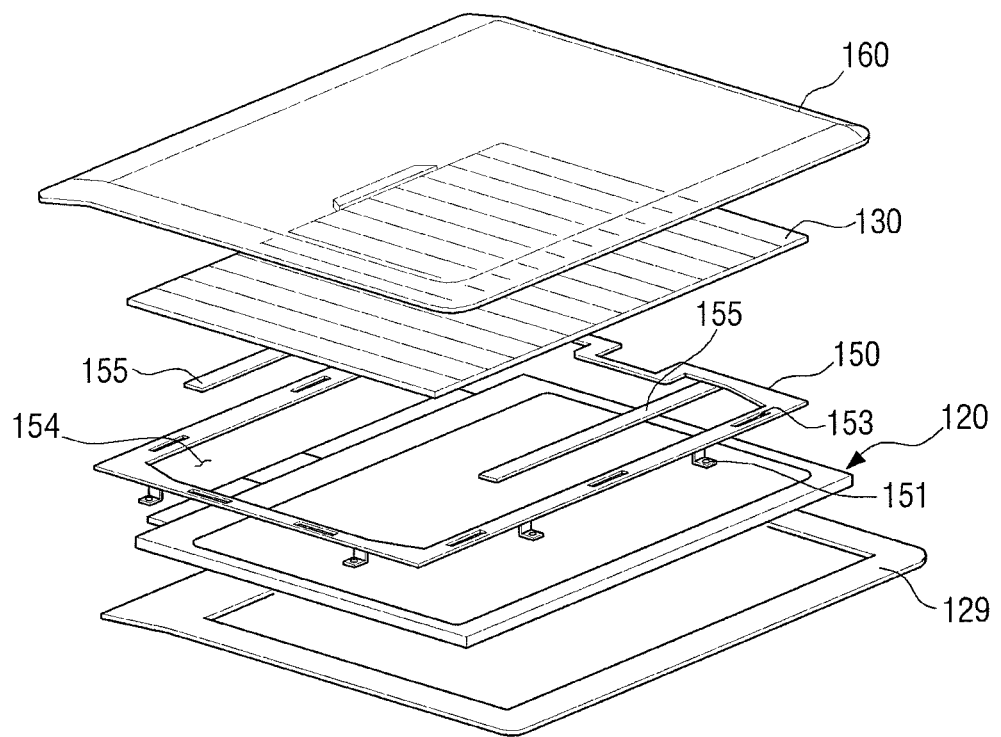
FIG. 3 is an exploded perspective view schematically illustrating a solar cell module and a display unit of a mobile electronic apparatus according to an exemplary embodiment of the present invention.

FIG. 2 is a perspective view schematically illustrating a mobile electronic apparatus according to an exemplary embodiment of the present invention, and FIG. 3 is an exploded perspective view schematically illustrating a solar cell module of a display unit of a mobile electronic apparatus according to an exemplary embodiment of the present invention.

Referring to FIGS. 2 and 3, a netbook computer is illustrated as an example of a mobile electronic apparatus 100, however, the present invention is not limited thereto, and the mobile electronic apparatus 100 may be any of a variety of portable electronic devices that include a display unit.

The mobile electronic apparatus 100 may include a main body unit 110, a display unit 120, a solar cell module 130, and a converting circuit 140. The main body unit 110 includes a main board 111 that processes various data such as texts, sounds, images, etc., and performs computing functions of the mobile electronic apparatus 100. The main body unit 110 also outputs the various data to the display unit 120, and includes a memory unit (not illustrated) that may store the data described above. A keyboard 112 that allows a user to input commands into the main board 111 is disposed on a top surface of the main body unit 110.

An electric power supply unit (not illustrated) having a rechargeable battery (not illustrated) may be disposed in the main body unit 110. The rechargeable battery may be charged by a commercial electric power source and by electric power generated by the solar cell module 130 as described below. The main board 111 controls the electric power supply unit so as to supply electric power and to charge the rechargeable battery. In addition, the main body unit 110 may include various elements that are well known in the art to be included in a main body unit of a related art mobile electronic apparatus.

Figure 4:
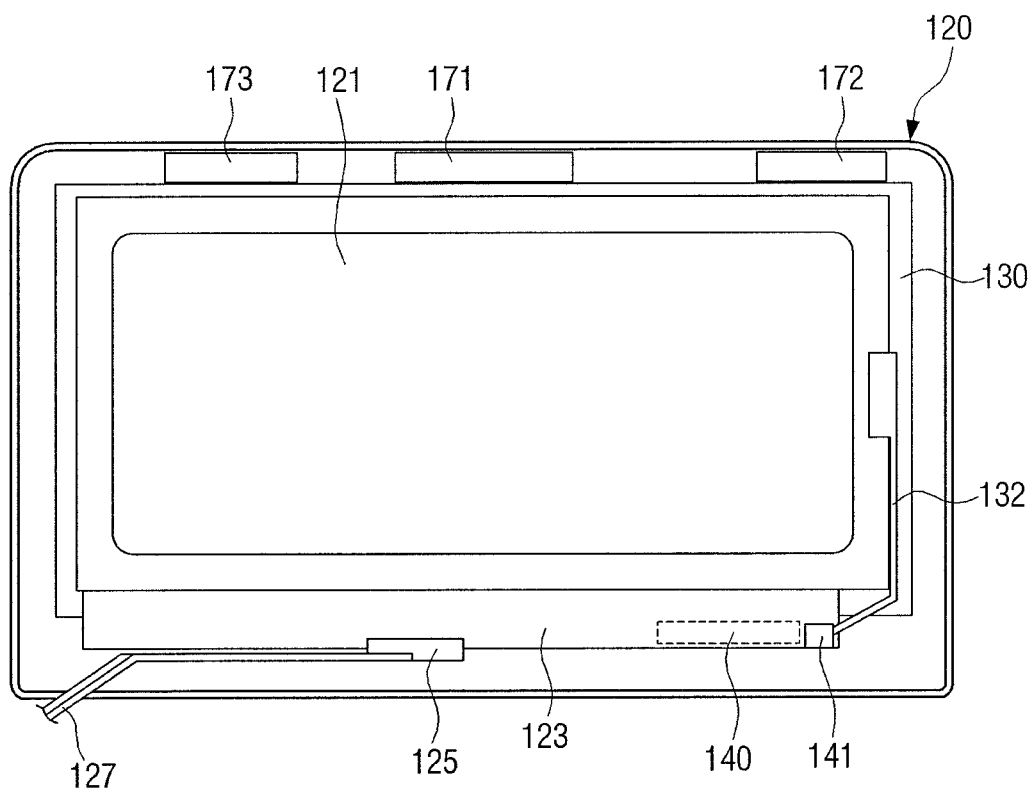
FIG. 4 is a view illustrating a display unit having a converting circuit disposed in a display driving board of the display unit according to an exemplary embodiment of the present invention.

FIG. 4 is a view illustrating a display unit having a converting circuit disposed in a display driving board of the display unit according to an exemplary embodiment of the present invention.

Referring to FIG. 4, the display unit 120 is connected to the main board 111 by hinges and may pivot with respect to the main body unit 110 by a predetermined angle. The display unit 120 may include any suitable apparatus that can display data, such as a liquid crystal display module, a field emission display module or any other similar display module. The display unit 120 may include a screen portion 121 in order to output various data and information of the mobile electronic apparatus 100 according to control of the main board 111 and a display driving board 123 (see FIG. 4) for driving the screen portion 121. The display driving board 123 drives the screen portion 121 according to control signals from the main board 111. A Time-CONtrol (T-CON) board may be used as the display driving board 123.

The display unit 120 may further include sub-boards that can perform other functions in addition to the display driving board 123. As shown in FIG. 4, the display unit 120 may include a camera module board 171, a communication board 172, an antenna board 173, and other similar boards or components that are disposed around the screen portion 121. The communication board 172 may include a variety of mobile and wireless communication system boards.

As noted, the display unit 120 includes the converting circuit 140 that stabilizes the electricity generated by the solar cell module 130 and supplies it to the main body unit 110. That is, the converting circuit 140 is disposed inside a housing that forms the display unit 120. The converting circuit 140 converts unstable electric power output from the solar cell module 130 that has an unstable voltage that is altered or modified according to a change of sunlight so as to be stable electric power having a constant voltage. A solar cell DC/DC converter may be used as the converting circuit 140. The converting circuit 140 may be arranged in the display unit 120 according to various methods and designs of the mobile electronic apparatus 100.

According to an exemplary embodiment of the present invention, the converting circuit 140 may be formed integrally with the display driving board 123 of the display unit 120. In other words, as illustrated in FIG. 4, the converting circuit 140 is formed on a portion of the display driving board 123 so that the display driving board 123 and the converting circuit 140 are formed as one single board. If the display driving board 123 and the converting circuit 140 are formed as a single board as described above, a space on the board may be reserved and the electric power output from the converting circuit 140 may be supplied to the main body unit 110 using a display cable 127 (see FIG. 4) connecting the display driving board 123 and the main board 111. The display cable 127 is connected to the display driving board 123 by a display connector 125. A connector 141 of the display driving board 123 connects the solar cell module 130 and the converting circuit 140. A solar cell cable 132 coupled to the solar cell module 130 is connected to the connector 141.

In a case when the display cable 127 is used to transmit electric power that has been converted in the converting circuit 140 to the main body unit 110, if the display cable 127 has extra wires that are not used for the electrical connection to the display unit 120 and the main board 111, then, the extra wires may be used to transmit the electric power output from the converting circuit 140. If the display cable 127 does not have the extra wires, the wires for transmitting the electric power output from the converting circuit 140 may be added as additional wires to the display cable 127.

Figure 5:
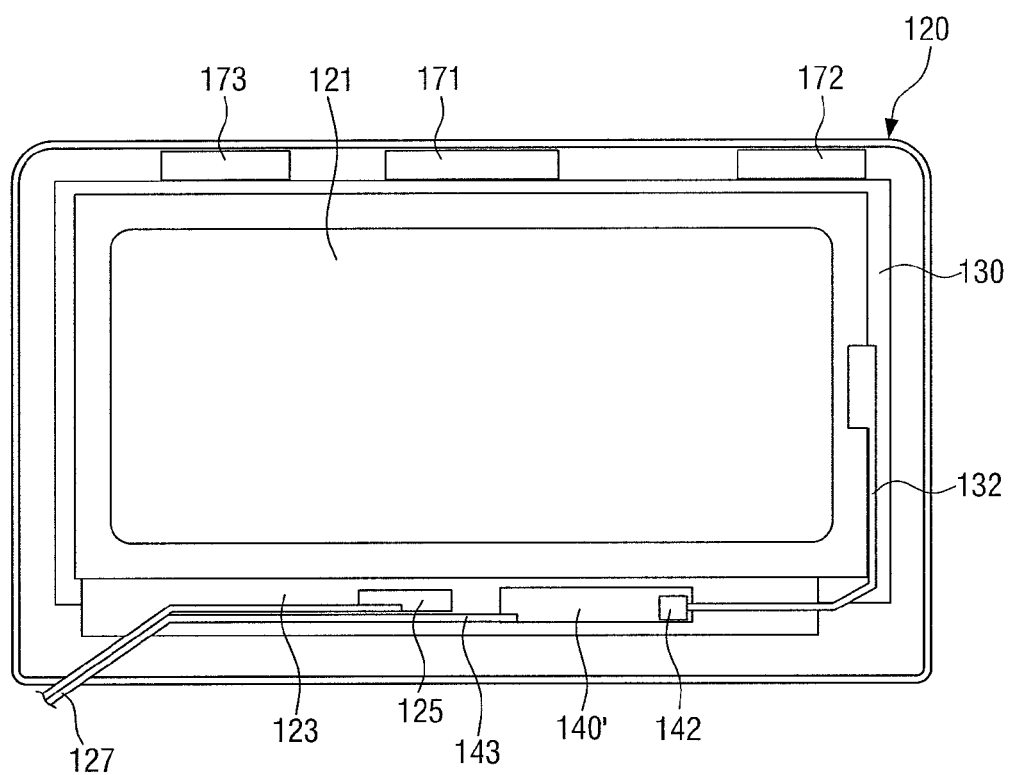
FIG. 5 is a view illustrating a display unit having a converting circuit formed on a separate exclusive board according to an exemplary embodiment of the present invention.

FIG. 5 is a view illustrating a display unit having a converting circuit formed on a separate exclusive board according to an exemplary embodiment of the present invention.

Referring to FIG. 5, as another exemplary embodiment, the converting circuit 140 may be formed on an exclusive board 140' that is separated from the display driving board 123. In other words, as illustrated in FIG. 5, the converting circuit 140 is formed on the separate converter board 140' and the converter board 140' is disposed inside the display unit 120. If the converting circuit 140 is formed on the separate converter board 140', then the converting circuit 140 may be arranged at an optimum position according to the design of the display unit 120. In this case, the electric power and signals are transmitted to the main board 111 using the display cable 127 connecting the display driving board 123 and the main board 111 and using a separate converter board cable 143 connecting the exclusive converter board 140' to the main board 111. The display connector 125 is used to connect the display cable 127 to the display driving board 123. A connector 142 of the exclusive converter board 140' is used to connect the solar cell module 130 to the converter board 140'. The solar cell cable 132 is coupled to the solar cell module 130 and is connected to the connector 142.

Figure 6:
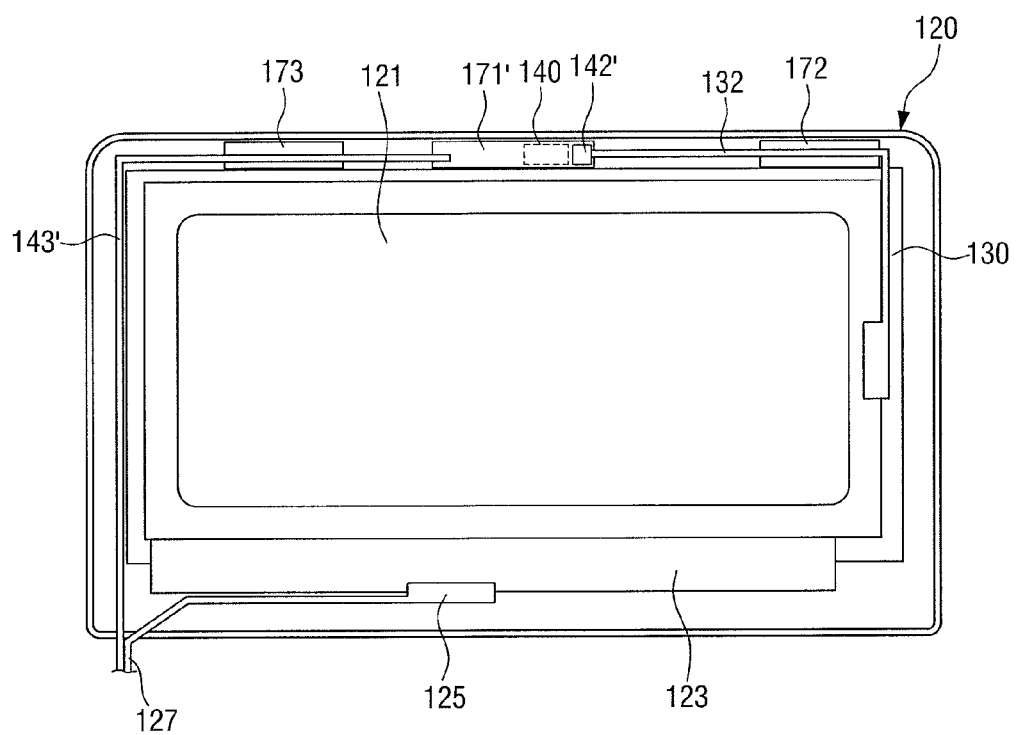
FIG. 6 is a view illustrating a display unit having a converting circuit formed on a separate camera module board according to an exemplary embodiment of the present invention.

FIG. 6 is a view illustrating a display unit having a converting circuit formed on a separate camera module board according to an exemplary embodiment of the present invention.

Referring to FIG. 6, as another example, the converting circuit 140 may be formed integrally with one sub-board 171 from among sub-boards 171, 172, and 173 that are disposed in the display unit 120 and have different functions than the display driving board 123. For example, as illustrated in FIG. 6, the converting circuit 140 is formed on a camera module board 171' such that the camera module board 171' may perform a converter function in addition to the camera function.

However, the present invention is not limited to the exemplary embodiment disclosed above, and the sub-board on which the converting circuit 140 is disposed is not limited to the camera module board 171', as described above. The converting circuit 140 may be disposed on any one among sub-boards 171, 172, and 173 having specific functions and disposed inside the display unit 120, such as a communication board 172, which may be a $3^{rd}$ Generation (3G) system board or a $4^{th}$ Generation (4G) system board, the antenna board 173, the camera module board 171', or any other suitable sub-board.

In such a case, the electric power and the signals are transmitted using the display cable 127 connecting the display driving board 123 and the main board 111 and using a separate converter cable 143' connecting any one of the sub-boards 171, 172, and 173. A connector 142' provided in the sub-boards 171, 172, and 173 is used to connect the solar cell module 130 and the converting circuit 140. The solar cell cable 132 is coupled to the solar cell module 130 and is also connected to the connector 142'.

The display driving board 123 is connected with the main board 111 of the main body unit 110 via the display cable 127. The display cable 127 is connected to the display driving board 123 by the display connector 125. Ground parts of the display cable 127 are shielded in order to prevent noise, such as Electromagnetic Interference (EMI). In the present exemplary embodiment, the electric power converted by the converting circuit 140 is transmitted to the main board 111 via the display cable 127. The main board 111 controls the electric power transmitted via the display cable 127 so as to charge the rechargeable battery or to be supplied to other elements of the mobile electronic apparatus 100 that require power.

Accordingly, in the mobile electronic apparatus 100 according to the present exemplary embodiment, since the electric power stabilized by the converting circuit 140 is transmitted to the main board 111 of the main body unit 110 through the shielded display cable 127, the possibility of loss of electric power may be reduced compared to related-art mobile electronic apparatuses so as to transmit unstable electric power generated in the solar cells to the main body unit 10 via a separate electric power supply cable.

Also, since the converting circuit 140 is disposed in the display unit 120 in which the solar cell module 130 is also disposed, in the mobile electronic apparatus 100 according to the present exemplary embodiment, a length of a wire through which unstable electric power flows is shorter than that in the related-art mobile electronic apparatus, so as to reduce the possibility or the amount of electrical noise and interference. In the related-art mobile electronic apparatus, since the converting circuit 40 is disposed on the main board 30 of the main body unit 10 and the solar cells are disposed in the display unit 20, a length of the wire connecting the converting circuit 40 and the solar cells is longer than that of a wire used in the mobile electronic apparatus 100 according to an exemplary embodiment of the present disclosure.

The solar cell module 130 converts solar energy into electric power and is disposed on a rear surface of the display unit 120. In other words, the solar cell module 130 is disposed on the rear surface of the display unit 120, or in other words, on a surface of the display unit 120 that is opposite to a surface on which the screen portion 121 is disposed. The solar cell module 130 may be directly fixed to the rear surface of the display unit 120. However, the present invention is not limited thereto, and the solar cell module 130 may be attached or disposed on the rear surface of the display unit 120 in a variety of suitable manners. The electric power generated by the solar cell module 130 is transmitted to the converting circuit 140 through the solar cell cable 132.

According to another exemplary embodiment, a fixing bracket 150 (see FIG. 3) may be disposed between the solar cell module 130 and the display unit 120. The fixing bracket 150 allows the solar cell module 130 to be fixed to the display unit 120 and buffers the solar cell module 130.

Referring to FIG. 3, the fixing bracket 150 is formed as a substantially rectangular frame having an opening at a central portion 154 that corresponds to the circumference of the solar cell module 130. The fixing bracket 150 may be formed to secure the solar cell module 130 while fixing the display unit 120 to a case 129. For this, the fixing bracket 150 has a plurality of fixing portions 151 which are projected from the circumference of the fixing bracket 150 so as to fix the fixing bracket 150 to the case 129. The fixing bracket 150 also includes a plurality of fixing holes 153 so as to attach the display unit 120 to the solar cell module 130. The fixing bracket 150 can be fixed to the case 129 by using fastening elements such as screws or any other suitable fastening elements. The solar cell module 130 and the display unit 120 can be fixed to the fixing bracket 150 by using the fastening elements.

Also, a cushioning member 155 may be disposed in the central portion 154 of the fixing bracket 150. The cushioning member 155 has two slim band shapes that are disposed in the central portion 154 of the fixing bracket 150. However, the shape of the cushioning member 155 is not limited thereto, and may be formed in any suitable shape. Although not illustrated, the cushioning member 155 may be formed to have the same size and shape as those of the inner space 154 of the fixing bracket 150. Therefore, the cushioning member 155 may be formed to be various sizes and shapes as long as the cushioning member 155 may be disposed inside the inner space 154. The cushioning member 155 may be formed of a material that can absorb shocks, such as a sponge or any other suitable material, in order to absorb external shocks applied to the solar cell module 130.

Also, the fixing bracket 150 may be formed of a material having good thermal conductivity. If the fixing bracket 150 is made of such a material, then the fixing bracket 150 can absorb heat generated by operation of the solar cell module 130 and may evenly diffuse the heat to the whole of the display unit 120. Thus, the temperature increase due to use of the solar cell module 130 may be reduced. Therefore, electric power generating efficiency of the solar cell module 130 may be increased. Also, the fixing bracket 150 may affix the solar cell cable 132 that is connected between the converting circuit 140 and the solar cell module 130.

If the solar cell module 130 is directly exposed to the outside, the solar cell module 130 may be damaged by shocks or environmental contamination. A protection cover 160 may be disposed above the solar cell module 130 in order to prevent the solar cell module 130 from being damaged and contaminated. One example of the protection cover 160 is illustrated in FIG. 3. The protection cover 160 is made of a transparent material through which sunlight can pass. If the protection cover 160 is disposed above the solar cell module 130, as described above, then the solar cell module 130 may be prevented from being damaged by the external shocks or by contamination.

Figure 7:
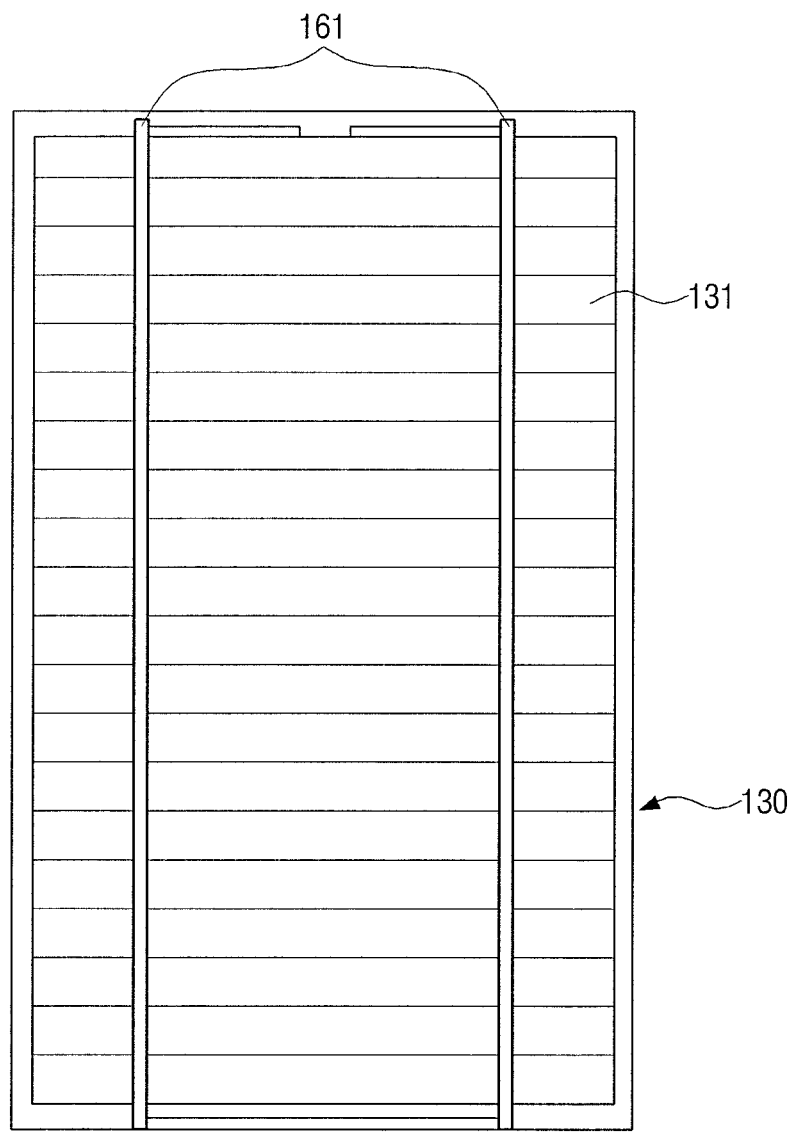
FIG. 7 is a plan view illustrating a gap maintaining member disposed between a protection cover and a solar cell module in a mobile electronic apparatus according to an exemplary embodiment of the present invention.
Figure 8:
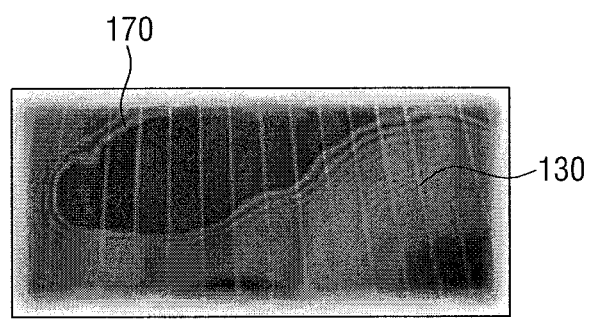
FIG. 8 is a view illustrating an example of wave patterns generated when pressure is applied to a protection cover of a mobile electronic apparatus according to an exemplary embodiment of the present invention.

FIG. 7 is a plan view illustrating a gap maintaining member disposed between a protection cover and a solar cell module in a mobile electronic apparatus according to an exemplary embodiment of the present invention, and FIG. 8 is a view illustrating an example of wave patterns generated when pressure is applied to a protection cover of a mobile electronic apparatus according to an exemplary embodiment of the present invention.

Referring to FIGS. 7 and 8, when the protection cover 160 is disposed above the solar cell module 130 there is a gap between the protection cover 160 and the solar cell module 130. If the solar cell module 130 has a size of 8 inches or more, then a shape of the protection cover 160 may be altered so as to droop down due to the weight of the protection cover 160. If the shape of the protection cover 160 is altered, the gap between the solar cell module 130 and the protection cover 160 is not constant so that the protection cover 160 may be variously in contact with the solar cell module 130. In addition, when external pressure is applied to the protection cover 160 in such a case, as illustrated in FIG. 8, wave patterns 170 may be formed on the top surface of the solar cell module 130. Therefore, as shown in FIG. 7, a gap remaining member 161 may be disposed in the space between the protection cover 160 and the solar cell module 130 in order to prevent the protection cover 160 from being in contact with the solar cell module 130 and to prevent the wave patterns from occurring due to a drooping of the protection cover 160.

The gap maintaining member 161 is attached to the solar cell module 130 so as to occupy the gap between the solar cell module 130 and the protection cover 160. The gap maintaining member 161 may be disposed on portions of the solar cell module 130 where the solar cells 131 do not exist on a top surface of the solar cell module 130. FIG. 7 illustrates two gap maintaining members 161 which are disposed in parallel to each other on portions of the solar cell module 130 which do not generate electric power. However, the present invention is not limited to the present exemplary embodiment of the gap maintaining member 161, and other suitable shapes and arranging positions of the gap maintaining member 161 may be used. For example, the gap maintaining member 161 may be formed as various shapes as long as the gap maintaining member 161 uniformly maintains the gap between the protection cover 160 and the solar cell module 130 and does not interfere with electric power production of the solar cell module 130. Also, an insulating tape may be used as the gap maintaining member 161.

With a mobile electronic apparatus according to the exemplary embodiments of the present invention as described above, since both the solar cell module and the converting circuit are arranged in the display unit, the solar cell module and the converting circuit are located close to each other. Therefore, the length of the wire through which unstable electricity flows between the solar cell module and the converting circuit is shorter than that of the related-art mobile electronic apparatus. As a result, a decline of power generation efficiency of the solar cell module that may be generated by unstable electric power may be minimized.

Also, since the possibility and amount of electrical noise and interference increases as a distance traveled by the unstable electricity increases, in the mobile electronic apparatus according to the exemplary embodiments of the present invention having a shorter travelling distance of the unstable electricity, the electrical noise and interference may be minimized so that the noise generated by the solar cell module affects other elements.

Also, with the mobile electronic apparatus according to exemplary embodiments of the present invention, since the fixing bracket is disposed between the display unit and the solar cell module so as to affix the solar cell module and to effectively diffuse heat generated in the solar cell module, the electric power generation efficiency of the solar cell module may be increased.

Also, with the mobile electronic apparatus according to the exemplary embodiments of the present invention, since the gap maintaining member is disposed between the solar cell module and the protection cover for protecting the solar cell module, the protection cover may be prevented from being in contact with the solar cell module.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile electronic apparatus comprising:
   a main body unit including a main board;
   a display unit, including a display driving board, disposed so as to rotate with respect to the main body unit for operating according to a control of the main board;
   a solar cell module disposed on a rear surface of the display unit for generating electric power by converting solar energy into electric power;
   a converting circuit disposed inside the display unit for stabilizing the electric power generated by the solar cell module so as to supply stable electric power; and
   a display cable connecting the display unit and the main board,
   wherein the electric power converted by the converting circuit is supplied to the main board through the display cable, and
   wherein the converting circuit is formed on the display driving board.

2. The mobile electronic apparatus of claim 1, further comprising a fixing bracket disposed between the display unit and the solar cell module so as to affix the solar cell module to the display unit.

3. The mobile electronic apparatus of claim 2, wherein the fixing bracket comprises a cushioning member.

4. The mobile electronic apparatus of claim 2, wherein the fixing bracket is formed of a thermally conductive material.

5. The mobile electronic apparatus of claim 1, further comprising a protection cover disposed above the solar cell module,
   wherein the protection cover is transparent so that sunlight can pass through the protection cover.

6. The mobile electronic apparatus of claim 5, further comprising a gap maintaining member disposed between the protection cover and the solar cell module.

7. The mobile electronic apparatus of claim 6, wherein the gap maintaining member comprises an insulating tape.

8. A mobile electronic apparatus comprising:
   a main body unit including a main board;
   a display unit, including a display driving board, disposed so as to rotate with respect to the main body unit for displaying data according to a control of the main board;
   a solar cell module disposed on a rear surface of the display unit for generating electric power by converting solar energy into electric power;
   a fixing bracket disposed between the display unit and the solar cell module so as to affix the solar cell module to the display unit;
   a protection cover disposed above the solar cell module and which is transparent so that sunlight can pass through the protection cover;
   a converting circuit disposed inside the display unit for stabilizing the electric power generated by the solar cell module so as to supply stable electric power; and
   a display cable connecting the display unit and the main board,
   wherein the electric power converted by the converting circuit is supplied to the main board through the display cable, and
   wherein the converting circuit is formed on the display driving board.

9. A display unit of a mobile electronic apparatus that includes a main body unit having a main board, the display unit comprising:
   a display driving board;
   a solar cell module disposed on a rear surface of the display unit for generating electric power by converting solar energy into electric power; and
   a protection cover disposed above the solar cell module and which is transparent so that sunlight can pass through the protection cover;
   a converting circuit disposed inside the display unit for stabilizing the electric power generated by the solar cell module so as to supply stable electric power; and
   a display cable connecting the display unit and the main board,
   wherein the electric power converted by the converting circuit is supplied to the main board through the display cable, and
   wherein the converting circuit is formed on the display driving board.

10. The display unit of claim 9, further comprising a solar cell cable connecting the solar cell module to the converting circuit.

11. The display unit of claim 9, wherein the display unit is disposed so as to rotate with respect to the main body unit and to display data according to a control of the main board.

* * * * *